United States Patent [19]

Kightlinger et al.

[11] 4,301,017
[45] Nov. 17, 1981

[54] STABLE, LIQUID STARCH GRAFT COPOLYMER COMPOSITION

[75] Inventors: Adrian P. Kightlinger; Edwin L. Speakman; Grant T. Van Duzee, all of Clinton, Iowa

[73] Assignee: Standard Brands Incorporated, New York, N.Y.

[21] Appl. No.: 144,009

[22] Filed: Apr. 28, 1980

[51] Int. Cl.³ .......................................... D06M 15/22
[52] U.S. Cl. ..................... 252/8.6; 8/115.6; 260/17.4 GC; 260/17.4 ST; 427/389.9
[58] Field of Search ............... 260/17.4 GC, 17.4 ST; 427/389.9; 28/169; 8/115.6; 252/8.6

[56] References Cited

U.S. PATENT DOCUMENTS

| | | | |
|---|---|---|---|
| 2,922,768 | 1/1960 | Mino et al. | 260/17.4 GC X |
| 3,061,471 | 10/1962 | Brockway et al. | |
| 3,061,472 | 10/1962 | Brockway | |
| 3,095,391 | 6/1963 | Brockway et al. | 260/17.4 GC X |
| 3,138,564 | 6/1964 | Borunsky | 260/17 |
| 3,377,302 | 4/1968 | Gugliemelli et al. | 260/17.4 GC X |
| 3,669,915 | 6/1972 | Jones et al. | 260/17.4 GC |
| 3,770,672 | 11/1973 | Yoshizawa et al. | 260/17.4 ST |
| 3,984,361 | 10/1976 | Gugliemelli et al. | 260/17.4 GC |
| 4,029,616 | 6/1977 | Nakashio et al. | 260/17.4 ST |
| 4,115,332 | 9/1978 | Young et al. | 260/17.4 GC |
| 4,192,783 | 3/1980 | Bomball et al. | 260/17.4 GC X |
| 4,204,983 | 5/1980 | Swarthout et al. | 260/17.4 GC |

FOREIGN PATENT DOCUMENTS 869501 5/1961 United Kingdom .

OTHER PUBLICATIONS

"Efficiency and Frequency of Grafting Methyl Methacrylate to Granular Corn Starch", J. Polymer Sci.: Part A, vol. 2, pp. 3721-3731 (1964).
"Grafting of Poly(vinylacetate) to Granular Corn Starch", ACS Div. Org. Coatings Pkst. Chem. Prep.: 2, pp. 502-508 (1967).
"Block and Graft Copolymerization", vol. 1, pp. 2-4 (1973), John Wiley & Son.

Primary Examiner—Ronald H. Smith
Assistant Examiner—Thurman K. Page
Attorney, Agent, or Firm—Richard Kornutik

[57] ABSTRACT

This invention discloses stable, aqueous polymeric dispersions comprised of at least 25% solids, dry basis, of a starch graft copolymer of a thinned and derivatized starch and at least one vinyl monomer. The starch has a degree of substitution of at least about 0.05 and an intrinsic viscosity of not less than about 0.12 deciliters per gram. The starch graft copolymers have a starch/monomer ratio of less than about 100/25. The dispersions are stable over extended periods of time at normal storage temperatures. Processes for the production of the dispersions are also disclosed.

30 Claims, 1 Drawing Figure

DAYS TO A 100% INCREASE IN VISCOSITY

STABLE, LIQUID STARCH GRAFT COPOLYMER COMPOSITION

BACKGROUND OF THE INVENTION

1. Field of the Invention

This invention relates to liquid polymeric compositions comprised of graft copolymers of starch and vinyl monomers. The compositions have high solids contents (25% by weight or greater) and are stable (show no excessive increase in viscosity and remain homogeneous) over extended periods of time. This invention also relates to processes for the production of the compositions and to processes using said compositions.

2. Initiators for Graft Polymerization

The production of graft copolymers of starch and vinyl monomers initiated by inducing free radicals on a starch is well known. Reviews have been published by J. C. Arthur, Jr. (*Advances in Macromolecular Chemistry*, Vol. 2, Academic Press, London & New York, pp. 1–87, 1970) and by G. F. Fanta (*Block and Graft Copolymers*, Vol. 1, John Wiley & Sons, London & New York, pp. 1–45, 1973).

A number of chemical activators are known. U.S. Pat. No. 3,138,564 to Borunsky discloses graft polymerization of 1,3 butadiene and acrylonitrile to starch using ozone and Fe(II). British Pat. No. 869,501 discloses the production of starch graft polymers utilizing polymerization initiators such as hydrogen peroxide, organic peroxides, hydroperoxides and dilute solutions of ceric ions. Yields may be improved by the use of an activator for these initiators such as mild reducing agents, e.g., ferrous ammonium sulfate, sodium formaldehyde sulphoxylate and the like. C. E. Brockway (*Am. Chem. Soc. Div. Org. Coatings Plast. Chem.*, pp. 502–508, 1967) and U.S. Pat. No. 3,061,471 to Brockway et al. and 3,061,472 to Brockway disclose the use of hydrogen peroxide to graft polymerize various vinyl monomers onto starch. Additionally, C. E. Brockway, (*J. Polymer Sci.*: Part A, Vol. 2, pp. 3721–3731, 1964) discloses use of hydrogen peroxide to graft polymerize methyl methacrylate to starch. For the most part these initiators are nonspecific and induce homopolymerization of single monomers and copolymerization of monomer mixtures as well as the desired graft polymerization of monomer and monomer mixtures to the starch. This produces products which tend to separate on storage.

Such problems can be minimized or avoided by the use of a Cerium(IV) initiator. Although some homopolymerization has been reported using Cerium(IV) by Fanta, et al. (*J. Appl. Polymer Sci.*, Vol. 10, pp. 919–937, 1966) the most important pathway for Cerium(IV) initiation of free radicals as outlined by Fanta (*Block and Graft Copolymers*, Vol. 1, p. 3, Ed. R. J. Ceresa, John Wiley & Sons, London & New York, 1973) would be expected to give graft copolymers to the exclusion of any homo- or copolymers. Extensive use has been made of this system to graft vinyl monomers to starch.

STARCHES AND MONOMERS

The use of a number of vinyl monomers with modified and unmodified starches both granular and gelatinized (pasted) as starting materials to prepare starch graft copolymers is known. U.S. Pat. No. 3,061,472 to Brockway discloses thin-boiling starches such as hypochlorite-oxidized and acid modified starches, starch ethers, starch acetates and enzyme-converted starches polymerized with an acrylic ester of an alkanol. The products have utility in sizing hydrophobic fibers. U.S. Pat. No. 3,095,391 to Brockway et al. teaches the use of granular unpasted starch, granular hypochlorite-oxidized starch, acid modified granular starch prepared by heating an acidified aqueous suspension of granular starch below the pasting temperature, granular starch reacted with ethylene oxide, and granular starch reacted with vinyl acetate as suitable materials for polymerization with vinyl monomers including vinyl acetate, ethyl acrylate, styrene, methacrylic acid, the butyl esters of acrylic and methacrylic acids, methyl methacrylate, acrylonitrile, acrylamide, 4-vinyl pyridine and diethylaminoethyl methacrylate. The products have utility as adhesives, flocculants and sizes.

GRAFT COPOLYMER COMPOSITIONS

The graft copolymerization reactions are usually carried out in aqueous media with the resulting compositions being obtained as aqueous dispersions or latices. Since the valuable and useful portion of such a latex is the graft copolymer portion of the dispersion it is desirable that the compositions be prepared at the highest practicable solids level. Furthermore, if the latices are to have any useful life they must be stable. That is, the dispersions should not separate into two or more phases or undergo any excessive increase in viscosity within the periods required for commercial usage. Such problems when producing polymer compositions from the previously known starches have been noted in U.S. Pat. No. 3,984,361 where gelatinized cationic starches polymerized with a vinyl monomer to form aqueous dispersions are stabilized by sonification and in U.S. Pat. No. 4,029,616 where aqueous dispersions of pullulan polymerized with an ethylenic compound are distinguished from those based on starch by exhibiting stability and not undergoing gelation or "aging".

SUMMARY OF THE INVENTION

The compositions of this invention are stable aqueous dispersions, which remain homogeneous and liquid for a period of at least 60 days at normal storage temperatures, comprised of at least 25% solids by weight of a starch graft copolymer of at least one vinyl monomer and a derivatized and thinned starch. The derivatized and thinned starch has a degree of substitution of at least 0.05 and an intrinsic viscosity of not less than 0.12 deciliters per gram (dl/g). The starch/monomer ratio of the graft copolymer is less than about 100/25 by weight, dry solids.

This invention also encompasses processes for producing the graft copolymers.

The starch graft copolymer compositions thus described do not have the problems of phase separation, undue increase in viscosity upon storage, and gelation inherent in those produced by prior processes. The nature of the compositions is such that they are readily diluted to the desired solids levels. Consequently, the high solids content of these compositions adds considerable commercial value to them since problems associated with storage and transportation of unnecessary amounts of water are greatly reduced.

BRIEF DESCRIPTION OF THE DRAWING

The sole FIGURE depicts the improvement in the stability of the final starch graft copolymer latex appearing at degrees of substitution of the starch of from about 0.05 to 0.1.

UTILITY

Figure 1:
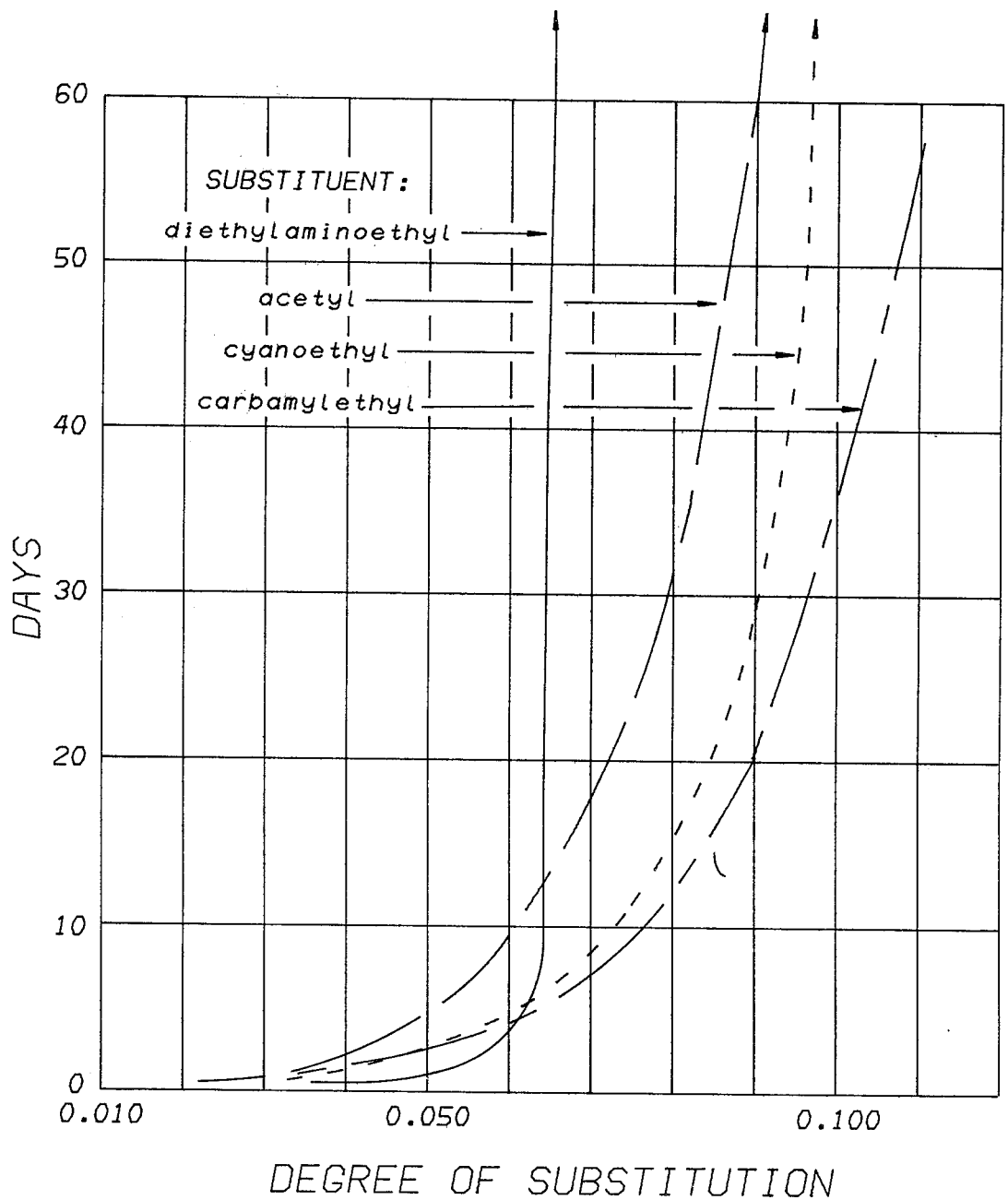

The stable dispersions of the invention can be used as sizing agents for hydrophobic fibers, and as coatings and adhesives for paper products, and as an ingredient in coatings such as paints. Other useful applications will be apparent from the foregoing descriptions of known starch graft copolymers and their uses.

OBJECTS OF THE INVENTION

It is an object of this invention to provide starch graft copolymer dispersions which remain liquid and show no excessive increase in viscosity under normal conditions of storage.

It is a further object of this invention to provide such starch graft copolymer dispersions at high solids contents.

A still further object of this invention is to provide processes for the production of the starch graft copolymer dispersions described.

It is also an object of this invention to provide coating compositions based on the starch graft copolymers described herein.

Another object is to provide a composition and method for sizing textile fibers.

Additional objects will be apparent from the following description and claims.

DETAILED DESCRIPTION OF THE INVENTION

The novel starch graft copolymer dispersions of this invention are prepared by derivatizing and thinning a granular starch, followed by graft polymerization thereto of a vinyl monomer or monomers initiated by a free radical initiator which acts to initiate polymerization onto the starch to the substantial exclusion of the initiation of homo- or copolymers of the vinyl monomer or monomers. It is preferred that the starch remain granular (insoluble) after the derivatization step.

It is especially preferred that the graft copolymer dispersions be prepared by a sequential series of steps comprising: forming a granular derivatized starch; thinning the starch; and then graft polymerizing at least one vinyl monomer onto the starch by means of a free radical initiator which acts to initiate graft polymerization onto the starch to the substantial exclusion of homo- or copolymerization of the vinyl monomer or monomers.

For optimum results the derivatized and thinned starch should be free of substances which interfere with the graft polymerization of the starch or the properties of the final dispersion. The derivatization step may introduce reagents, salts or by-products which have such effects. Such substances can readily be removed by washing the derivatized starch provided that the starch remains in granular form. Minor degrees of solubility can be tolerated in the granular starch since these are readily repressed by the addition of a water miscible organic liquid, such as ethyl alcohol, to the wash water.

The starch can be thinned by chemical means such as acid hydrolysis, followed by derivatization while keeping the starch in granular form. Likewise, the starch may first be derivatized and the granular product thereafter gelatinized and thinned. A combination of acid and enzyme thinning may also be employed. When derivatization is the first step it is preferred that thinning be accomplished by enzymatic means.

A further consideration is that the derivatized starch should be readily gelatinized and dispersed in water to facilitate the subsequent polymerization reaction.

Also, since the viscosity of the thinned derivative affects the viscosity of the final starch graft copolymer dispersion the viscosity of the starch derivative should be selected to keep the viscosity of the final dispersion consistent with its desired solids content.

PREPARATION OF THE STARCH DERIVATIVES

The starches applicable to the production of the derivatized and thinned starches of this invention are those such as corn starch, wheat starch, potato starch and the like. Corn starch is preferred.

The preparation of starch derivatives is well known. However, we have found that to produce starch derivatives with the properties which lead to stable dispersions upon graft polymerization with vinyl monomers it is necessary to control the degree of substitution. The type of substituent also has an effect on the stability of the dispersions. Likewise, it is necessary to control the degree of thinning of the starches if optimum physical properties, such as tensile strength and abrasion resistance, of the copolymers are to be achieved.

DEGREE OF SUBSTITUTION

At the same degree of substitution bulky and charged substituents on the starch tend to provide relatively more stable dispersions than small or uncharged substituents. Any substituent which does not interfere with polymerization and which provides starch derivatives exhibiting stable viscosities at solids levels of about 30% to 45% by weight after thinning is a suitable substituent. These include anionic, cationic and non-ionic substituents. The preferred substituents are of the cationic and non-ionic types. Carbamylethyl, alkyl, benzyl and benzalkyl starch derivatives are exemplary of the non-ionic derivatives. The dialkylaminoalkyl substituent exemplifies the cationic derivatives.

The preferred starch derivatives are those with hydroxyalkyl, cyanoalkyl, dialkylaminoethyl, and acyl substituents. The most preferred are the hydroxyethyl, cyanoethyl, diethylaminoethyl, carbamylethyl and acetyl derivatives.

The degree of substitution chosen will affect the rate of change in viscosity of the dispersion produced by graft polymerization. With higher degrees of substitution dispersions which do not double in viscosity in 30 months can be prepared. However, most industrial applications do not require such extremely stable latices. The practical considerations are that the final dispersions should not become so viscous that they are difficult to handle or must be thinned to a solids level too low for the intended use. The initial viscosity of the polymeric dispersion will depend upon the initial viscosity of the starch dispersion and this viscosity is related to the solids content of the starch dispersion. Increasing solids content increases the initial viscosity of the polymeric dispersion. Consequently, if a low solids content is adequate for the intended use the polymeric dispersion may be prepared at low solids content and consequent low initial viscosity thereby permitting greater increases in viscosity during storage without becoming unduly viscous.

The degree of substitution of a derivatized starch is not proportionally related to the properties which impart improved viscosity stability to the polymeric dispersions. At low degrees of substitution (about 0.02) there is little effect on viscosity stability of the dispersion obtained by graft copolymerization of the derivatized starches with vinyl monomers. However, dependent upon the type of substituent, a dramatic and unexpected improvement in the stability of the final starch graft copolymer latex appears at degrees of substitution of the starch of from about 0.05 to 0.1 as graphically illustrated in FIGURE 1. With a bulky and/or charged substituent such as the diethylaminoethyl radical, degrees of substitution above about 0.05 rapidly increase the stability. With the carbamylethyl radical a similar increase is seen at degrees of substitution above about 0.1. At degrees of substitution between 0.08 and 0.09 the cyanoethyl and acetyl derivatives show the same remarkable improvement in the stability of the final dispersion.

The starch derivatives of this invention have a degree of substitution of at least about 0.05. The maximum degree of substitution is limited only by practical considerations. It is desirable that the starch derivative be free of unreacted reagent, salts and by-products before polymerization. This is most economically done by washing the derivative and this is facilitated if the starch remains in the granular form and is not solubilized by excessive derivatization. Since higher degrees of substitution usually increase the solubility of the derivatives the degree of substitution selected should be consistent with removal of the reagent, salts and by-products.

The preferred range of degree of substitution is from about 0.05 to about 0.4 and the range from about 0.06 to about 0.2 is especially preferred.

THINNING OF THE DERIVATIZED STARCH

The starch derivatives useful in the practice of this invention are those that can be gelatinized and thinned. Thinning may be accomplished by known means such as acid hydrolysis or enzyme treatment. Thinning by enzymatic means such as alpha-amylase is preferred.

The degree of thinning of the starch, as determined by the intrinsic viscosity, is an important aspect of this invention, since it determines the initial viscosity of the starch graft copolymer dispersion, all other factors being equal. As a rule of thumb, the final starch graft copolymer dispersion will have an initial viscosity roughly 2 to 4 times that of the thinned starch derivative. The degree of thinning also affects the tensile properties of the products, which properties are an important consideration in such uses as paper coatings and textile sizes. These properties become much diminished when the intrinsic viscosity of the thinned starch falls below about 0.12 dl/g. There is no upper limit on the intrinisic viscosity other than that imposed by the necessity for obtaining a good dispersion and adequate mixing during the polymerization reaction. As is well-known, these factors are also a function of the equipment in which the polymerization reaction is conducted. A further factor, as previously discussed, is the initial viscosity of the intended product. Some thinning is, however, required to produce satisfactory products at the 25% and greater total solids levels contemplated by this invention.

As previously noted the degree of thinning is related to the tensile properties of the final graft copolymer. For example, free films of a graft copolymer prepared from a cyanoethyl starch with a degree of substitution of 0.161 thinned to intrinsic viscosities (dl/g) of about 0.10, 0.14, 0.18 and 0.27 and polymerized with ethyl acrylate demonstrate that relatively small changes in intrinsic viscosity can have a substantial effect on the physical properties of the graft copolymer. A free film cast from the copolymer obtained from the starch thinned to an intrinsic viscosity of about 0.10 dl/g had a tensile strength of about 1,470 g/mm$^2$. However, when the same starch was thinned to an intrinsic viscosity of about 0.14 dl/g a film from a copolymer prepared from that starch had a tensile strength greater than 2,000 g/mm$^2$. The tensile strength showed no marked increase above this value as the intrinsic viscosity increased but slowly diminished to about 1,950 g/mm$^2$ at an intrinsic viscosity of about 0.18 and to about 1,870 g/mm$^2$ at an intrinsic viscosity of about 0.27 dl/g.

Similar changes in abrasion resistance appeared when the copolymers were applied to a 50%/50% cottonpolyester blend yarn and the cycles to 11 breaks were measured on a Walker (T.M.) Abrader. With the copolymer prepared from the starch thinned to an intrinsic viscosity of about 0.10 only about 820 cycles were required for 11 breaks. However, when the copolymer was prepared from the starch thinned to about 0.14 dl/g the number of cycles required for 11 breaks rose above 1,100. The number of cycles for 11 breaks remained greater than 1,100 when the starch was thinned to an intrinsic viscosity of about 0.18 and used for a copolymer and fell to about 1,000 when the starch was thinned to an intrinsic viscosity of about 0.27 and used for a copolymer.

The preferred range of intrinsic viscosity of the thinned starches is from about 0.12 to about 0.28 dl/g. For optimum tensile properties of the graft copolymers the range of intrinsic viscosities from about 0.13 to about 0.21 dl/g is especially preferred.

Use of the Derivatized Starches to Prepare Stable Aqueous Dispersions of Graft Copolymers Monomers Any monomer polymerizable onto the derivatized and thinned starch through a free radical initiated reaction may be used to produce the starch graft copolymers. The monomer or combination of monomers should be chosen so that the starch graft copolymer dispersion produced comprises water insoluble graft copolymer particles dispersed in an aqueous continuous phase. In general these are vinyl monomers such as vinyl halides, vinyl esters, vinyl ethers, alkylvinyl ketones, N-vinyl carbazole, N-vinyl pyrrolidone, vinyl pyridene, styrene, alkyl styrenes, acrylic acid, alkyl acrylates, methacrylic acid, alkyl methacrylates, acrylamide, substituted acrylamides, vinylidene halides, itaconic acid, 1-3 butadiene and the like. Among these, acrylonitrile, methyl methacrylate, vinyl acetate, 2-ethylhexyl acrylate, and the lower alkyl acrylates such as methyl acrylate, ethyl acrylate, and butyl acrylate are preferred when a single monomer is used to form the graft copolymer.

The especially preferred single monomers used to produce the starch graft copolymers are methyl acrylate, ethyl acrylate, and methyl methacrylate.

As is well known, combinations of two or more monomers can be polymerized together to form copolymers or block copolymers and such combinations can also be used to produce starch graft copolymers with the derivatized and thinned starches. When two or more monomers are polymerized with the starches the preferred monomers are, dimethylaminoethyl methacrylate, ethyl acrylate, butyl acrylate, methacrylic acid, and methyl methacrylate.

Polymerization Initiators

Any polymerization initiator that acts to initiate free radical polymerization on the derivatized and thinned starches to the substantial exclusion of initiation of homo- or copolymerization of the monomer or mixture of monomers utilized to form a starch graft copolymer is a suitable initiator.

Ceric ammonium nitrate is an example of such an initiator. This initiator may be used in amounts from about 0.5% to 8% by weight of the derivatized and thinned starch. Amounts below about 0.5% do not provide adequate initiation of the graft polymerization and are apt to result in sizeable amounts of unreacted monomer. Initiator levels from about 1.4% to 4% by weight of the starch are preferred.

The combination of hydrogen peroxide and acetate ion also is a useful initiator. Sodium acetate or glacial acetic acid may be used to supply the acetate ion. This initiator may be used at a pH in the range from about 2 to about 9 and at initiating temperatures of about 40° to 90° C. The mole ratio of acetic acid to hydrogen peroxide is about 2 and the amount of peroxide from about 0.5% to 2.0% based on the weight of the starch.

Polymerization

The amounts of monomer or monomers added will vary according to the properties desired in the final dispersion. The dispersions of this invention are distinguished by their high solids content. These dispersions have a solids content of at least 25% by weight, dry basis and, preferably, at least 40% by weight, dry basis. The starch/monomer ratio may be about 100/25 by weight or less, dry basis and preferably is about 100/40 or less. The lower limit of this ratio is a matter of choice depending upon economic considerations and the intended viscosity of the final dispersion. As increasing amounts of monomer are incorporated in the dispersions the economic advantages of using the derivatized and thinned starch as a significant portion of the final copolymer are diminished.

In general, the starch/monomer ratio should be less than about 100/25. The preferred starch/monomer ratio is in the range from about 100/40 to about 100/200 by weight, dry basis. The especially preferred starch/monomer ratio is in the range from about 100/40 to about 100/100 by weight, dry basis.

The initial polymerization conditions should provide sufficient monomer to support the polymerization once it is initiated. This is readily accomplished in a conventional batch process where the monomer or monomers are added in a single increment. However, any mode of addition which will adequately utilize the initially generated free radicals without causing undue problems in temperature control will suffice; that is, the monomer or monomers may be added as a single increment, incrementally over the time of polymerization or continuously so long as the required conditions for polymerization are achieved. When mixtures of monomers are used they may be added as such to produce the conventional type of copolymer chain grafted onto the starch or may be added sequentially, individually or as discrete mixtures, to produce block copolymers grafted onto the starch.

The temperature at which the polymerization is carried out will depend upon the monomer system and catalyst used. Heating or cooling or a combination thereof may be required to achieve or maintain the desired polymerization temperature. Temperatures in the range from 0° to 100° C. may be utilized depending upon the catalyst and monomer system. Temperatures in the range from 25° to 80° C. are preferred. However, if a catalyst produces or requires a low pH prolonged exposure to such acidic conditions may result in excessive hydrolysis of the starch and adversely affect the properties of the final polymer.

Surfactants may be used to stablize the dispersions during the polymerization or they may be added after the reaction is complete. When present during the polymerization the surfactant chosen should not interfere with the initiator system or otherwise adversely affect the polymerization reaction. Triton X-200 and Triton X-405 (Rohm and Haas Co.) are examples of surfactants that do not interfere with the polymerization reaction when the initiator is a cerium compound.

Coatings

The starch graft copolymer dispersions of this invention may advantageously be used in coatings such as paper coatings, water-based paints and the like. All common fillers such as clays, calcium carbonate, titanium dioxide and similar materials as well as pigments may be used with the dispersions. Excessively cationic dispersions may flocculate the fillers. Since 50% or more of the adhesive element of these dispersions may be derived from starch, the use of these dispersions provides distinct economic advantages as well as conserving expensive monomers derived from increasingly scarce fossil hydrocarbons. Morever, the relatively high viscosity of the dispersions enables the formulation of coatings without the addition of thickeners.

Sizing Textile Yarns

The starch copolymer dispersions of this invention may be applied by conventional means to textile yarns to size the yarns in order to reduce yarn breakage during subsequent processing. When the dispersions are used as sizes it is desirable that the derivatized and thinned starches used to make the dispersions have an intrinsic viscosity in the range from about 0.12 to about 0.28 dl/g. A starch graft copolymer dispersion where the starch used to make the graft copolymer has been thinned to an intrinsic viscosity in the range from about 0.13 to about 0.21 dl/g is preferred when the dispersion is to be applied to textile yarns as a size.

The following examples are illustrative of the invention and not intended to limit the scope of the invention or the ambit of the claims.

Unless otherwise designated, the term "solids" and "percent solids" as used herein refers to total dry substance including the starch and, where appropriate, any monomer(s) utilized to produce the starch graft copolymer dispersion. Viscosities given in centipoise (cps), unless otherwise indicated, have been determined at 24° C. using a model H.A.T. Brookfield viscometer and the appropriate spindle. Expressions and procedures used in the specifications and claims follow:

Activity of Soluble Alpha Amylase.

The activity of soluble alpha amylase preparations was determined by a modification of Standard Test Method, AATCC 103, 1965 "Bacterial Alpha Amylase Enzymes Used in Desizing, Assay of" published in the 1967 Edition of Technical Manual of the American Association of Textile Chemists and Colorists, Volume 43, pp. B-174 and B-175. The method was modified as follows: the buffer solution for the starch substrate was prepared dissolving 25.3 g of c.p. sodium hydroxide and 340 g of c.p. potassium dihydrogen phosphate in water and diluting the solution to 2 liters; 125 ml of the buffer solution was added to the cooled, pasted starch substrate before the substrate was brought to the 500 ml volume; the pH of the starch substrate was determined and, if necessary, adjusted to 6.20±0.05; and a 0.025 molar calcium chloride solution, prepared by dissolving 11.1 g of anhydrous c.p. calcium chloride in water and bringing the volume to 4 liters, was used for enzyme sample dilutions. Results were converted to liquifons where one Bacterial Amylase Unit equals 2.85 liquifons.

Intrinsic Viscosity.

Intrinsic viscosity measurements were made on a number of 32% starch pastes previously liquified and thinned to Brookfield viscosities ranging from 40 cps to 30,800 cps. Measures of Reduced Viscosity were first obtained at five dilutions (0.5 g/100 ml, 1.0 g/100 ml, 1.5 g/100 ml, 2.0 g/100 ml and 2.5 g/100 ml) of each sample according to the procedures of Myers and Smith "Methods in Carbohydrate Chemistry", Volume IV, page 124–127, edited by R. L. Whistler, Academic Press, New York, 1964. Intrinsic viscosity values were then derived by extrapolating the reduced viscosity values obtained at the five dilutions to zero concentration.

The following formulas were used to calculate the reduced viscosity values. In these formulas $t_o$=flow time in the Cannon-Ubbelohde viscometer for pure solvent (1.00 M NaOH Solution), t=flow time in the Cannon-Ubbelohde viscometer for the diluted starch solution made 1.00 M with respect to NaOH and C=concentration of the diluted starch in grams per 100 ml.

Specific viscosity=$n_{sp}$=(t-$t_o$)/$t_o$

Reduced viscosity=$n$red=($n_{sp}$/C)

Kjeldahl Nitrogen Analysis.

Kjeldahl analyses for nitrogen were done using the standard Analytical Method of the Corn Refiners Association, Number B-48.

Carboxyl Analysis.

Analyses for carboxyl groups were made using the standard Analytical Method of the Corn Refiners Association, Number C-22.

Acetyl Analysis.

Carboxyl groups were determined using the standard Analytical Method of the Corn Refiners Association, Number C-2.

Degree of Substitution.

The degree of substitution (D of S) was determined using the following formulas:
(a) Nitrogen-containing substituents $$D \text{ of } S = \frac{(162)(\% \text{ Nitrogen})}{(100)(14) - (A)(\% \text{ Nitrogen})}$$

A=Molecular weight of the nitrogen-containing radical minus one
  Cyanoethyl, A=53
  Carbamylethyl, A=71
  Diethylaminoethyl, A=99
(b) Acetyl-containing substitutents $$D \text{ of } S = \frac{(162)(\% \text{ Acetyl})}{(100)(43) - (42)(\% \text{ Acetyl})}$$

(c) Carboxyl-containing substitutents $$D \text{ of } S = \frac{(162)(\% \text{ Carboxyl})}{(100)(45) - (44)(\% \text{ Carboxyl})}$$

EXAMPLE I

This Example illustrates the preparation of a graft copolymer of the present invention by a batch process.

An amount of a starch slurry containing 287.3 g of starch (dry substance) was placed in a resin kettle equipped with an agitator and a thermometer. The slurry was heated to 43° C. and 34 ml of a solution containing 2.4 g of NaOH and 8.9 g of NaCl were added along with 28.7 g of $Na_2SO_4$.

Then, 15.8 g of acrylonitrile were added and the reaction was allowed to proceed for 14 hours while maintaining a temperature of 43° C. The pH of the reaction mixture was then adjusted to 7 with 4.6 ml of 20° Bé muriatic acid, the product was filtered and the filter cake washed. The cyanoethyl starch had a D of S of 0.14 based on its nitrogen content.

The wet cake containing 300 g of cyanoethyl starch was suspended at a solids level of 32 percent in deionized water in a 2 liter resin kettle equipped with an agitator, thermometer, reflux condenser and nitrogen sparge. The pH of the suspension was adjusted to 7.5–7.8 and 3729 liquifons of alpha-amylase derived from *B. subtilis* were added. The cyanoethyl starch was gelatinized and thinned according to the following time temperature schedule:

| Time, minutes | 0 | 15 | 45 | 75 | 80 | 100 |
|---|---|---|---|---|---|---|
| Temp., °C. | 28 | 53 | 78 | 78 | 90 | 96 |

The alpha-amylase was inactivated at 96° C. and the thinned starch was cooled while sparging with nitrogen. The viscosity of the thinned starch was 260 cps.

After cooling the thinned starch to a temperature of 60° C., 10.7 g Triton X-200 (as purchased) and a mixture of 109.2 g of ethyl acrylate and 9.6 g of acrylonitrile were added. The temperature was lowered to 30°–35° C. and 3.75 g of ceric ammonium nitrate dissolved in 50 g of deionized water were added.

After the exothermic reaction subsided, 1.2 g methacrylic acid was added at 40° C. and heating was continued to a temperature of 60° C. The reaction mixture was maintained at a temperature of 60° C. for 3 hours and then 0.5 g each of ammonium persulfate and sodium metabisulfite was incorporated into the reaction mixture to reduce the level of unreacted monomers. The mixture was maintained at 60° C. for an additional 50 minute period, cooled to room temperature and the pH adjusted to about 8.5 with a solution of 28 percent ammonium hydroxide (2.7 g).

The final preparation had a solids content of 39.2 percent. The results set forth in the following table illustrate the viscosity stability of the copolymer.

TABLE 1

| Period | Viscosity (cps) |
|---|---|
| 1st day | 560 |
| 3 days | 588 |
| 6 days | 632 |
| 10 days | 660 |

TABLE 1-continued

| Period | Viscosity (cps) |
|---|---|
| 2 months | 640 |

EXAMPLE II

This example illustrates the preparation of a graft copolymer of the present invention using incremental addition of the monomers.

A starch slurry containing 2,954 g of starch (dry substance) was placed in a resin kettle equipped with an agitator and a thermometer. The slurry was heated to 43° C. and 350 ml of a solution containing 70 g NaOH and 265 g of NaCl per liter were added along with 295 g of $Na_2SO_4$.

Thereafter, 162 g of acrylonitrile were added and the reaction allowed to proceed for 16 hours while maintaining the temperature at 43° C. The pH of the reaction mixture was then adjusted to 6.3 with 20 Be' muriatic acid, the mixture filtered and the filter cake washed. The cyanoethyl starch had a D of S of 0.14 based on its nitrogen content.

The wet cake containing the starch derivative was slurried with deionized water to 32 percent solids and 2,811 g of slurry were placed into a five liter resin kettle equipped with an agitator, thermometer, reflux condenser and nitrogen sparge. The pH of the slurry was adjusted to 7.5 and 11,187 liquefons of alpha-amylase derived from *B. subtilis* were added. The following time-temperature schedule was followed to gelatinize and thin the starch.

| Time, minutes | 0 | 5 | 10 | 15 | 20 | 25 | 30 | 35 | 47 | 49 | 51 | 81 |
|---|---|---|---|---|---|---|---|---|---|---|---|---|
| Temp., °C. | 21 | 32 | 43 | 54 | 65 | 69 | 73 | 78 | 78 | 88 | 96 | 96 |

The alpha-amylase was inactivated at 96° C. and the thinned starch was cooled to 50°–55° C. while sparging with nitrogen. The viscosity of the thinned starch was 365 cps. Triton X-200 in the amount of 73.5 g, 332 g of ethyl acrylate and 29.25 g of acrylonitrile (one-half of the total amount to be added) were added to the thinned starch. Then 22.5 g of ceric ammonium nitrate dissolved in 60 g of deionized water were added while the temperature was kept at 50°–55° C. At a temperature of 75° C., 332 g of ethyl acrylate, 29.25 g of acrylonitrile and 7.2 g of methacrylic acid were slowly incorporated into the mixture over a one hour period following which the temperature of the reaction mixture was maintained at 75° C. for three hours. After the polymerization reaction was completed, 0.5 g each of ammonium persulfate and sodium metabisulfite were added to the reaction mixture to reduce the level of unreacted monomers and the pH was adjusted to about 8.5.

The final product had a solids content of 45%. The results set forth in the following table illustrate the viscosity stability of the copolymer.

TABLE 2

| Period | Viscosity (cps) |
|---|---|
| Fresh | 980 |
| 1 day | 968 |
| 2 months | 1060 |
| 4 months | 1440 |

EXAMPLE III

This Example illustrates the use of hydrogen peroxide plus acetate ion to initiate the graft polymerization of thinned, derivatized starch. Viscosities were determined at 24° C. using a Model 7.006 Nametre Viscometer (Nametre Co., Edision, N.J.) and converted to Brookfield Viscosity equivalents.

An amount of starch slurry containing 300 g (dry substance) of a cyanoethyl starch having a D of S of 0.11 was placed in a 2 liter resin pot equipped with an agitator, thermometer, reflux condensor and nitrogen sparge. To this slurry was added 0.120 g of Vanzyme 13, marketed by R. T. Vanderbilt, (20,000 liquifons per gram) and the pH adjusted to 6.7, with hydrochloric acid. The temperature of the slurry was raised to 75° C., held 45 minutes, then raised to 90° C. and held for 15 minutes to inactivate the enzyme. The viscosity of the thinned starch was 260 cps.

The thinned starch was cooled to 70° C. while sparging with nitrogen. Then 24 g of 28 percent solids Triton X-200 and 46 ml of a total of 137 ml of a monomer mixture containing 90 percent styrene and 10 percent acrylonitrile were added. The ratio of starch to monomer was 100:40. There were then added 10 ml of glacial acetic acid, sufficient nitric acid to lower the pH of the reaction mixture to 2.6, and 10 ml of a 30 percent hydrogen peroxide solution. The temperature of the mixture was raised to 80° C. At the end of one hour, polymerization had started as shown by a blue color in thin layers of the mixture. The remaining 91 ml of the monomer mixture were added and the temperature of the reaction mixture was raised to 90° C. and maintained there for 2¼ hours. The pH of the mixture was adjusted to 7.4 with ammonium hydroxide solution. The resulting liquid preparation had a solids content of 39.4 percent. The initial viscosity of the preparation was 238 cps and after 4 months had risen to only 300 cps.

Dried films of the preparation on glass were clear and adherent.

EXAMPLE IV

This Example illustrates the preparation of starch graft copolymers according to the method disclosed in U.S. Pat. No. 3,061,472. The teachings of Example I of U.S. Pat. No. 3,061,472 were followed except that Igepal CO-887 was used in place of Igepal CO-630 and the appropriate amount of 29% hydrogen peroxide was used instead of 50% hydrogen peroxide. The teachings were followed to prepare products at 16%, 25%, 30% and 48% solids as follows.

A. 16% Solids

A starch paste was prepared by stirring 67.5 g of a commercial corn starch oxidized with sodium hypochlorite containing about 1.0% carboxyl groups in 143 g of water and heating at 98°–99° C. for 30 minutes. While the paste was cooling 613.5 g of water were added. To this mixture were added 1.0 g of glacial acetic acid, 0.30 g of ferrous ammonium sulfate and 9.4 g of Igepal CO-887 (a 70% solution of a nonylphenoxy ether of polyoxyethylene having on the average 30 oxyethylene groups per molecule). The Igepal 880 series was listed as preferred surfactants in Table 1 of Example 3 of U.S. Pat. No. 3,061,472. The paste was cooled to 48° C. and 67.5 g of ethyl acrylate were added followed by the addition of 1.55 g of hydrogen peroxide. Within a few seconds the temperature of the reaction mixture began to rise. The temperature was then adjusted to and held at 60° C. for three hours. During this time the reaction mixture was subjected to constant, vigorous agitation. After these three hours the product was cooled to room temperature. The viscosity of this product was 1480 cps at 24° C.

B. 25% Solids

The procedure of A was repeated but with total solids content increased to 25% by reducing the total quantity of water to 410 g. The product was a soft gel with a viscosity greater than 13,000 cps at 24° C.

C. 30% Solids

Using the procedure in A, above, with total solids content increased to 30% by reducing total water content to 320 g the resulting product was a firm, gritty gel with a viscosity in excess of 30,000 cps at 24° C.

D. 48% Solids

Using the procedure in A of this example with a larger batch size the solids content was increased to 48% by decreasing the proportion of water. The resulting product was a solid, rubbery mass. The viscosity was not measurable.

Of A through D, only the product produced at 16% solids could be considered to be liquid. On storage this product showed phase separation in less than one month demonstrating an unstable emulsion.

EXAMPLE V

This Example illustrates the effect of degree of substitution of the starch on viscosity stability of cyanoethyl, acetyl, dimethylaminoethyl, and carbamylethyl starch derivatives.

A. Preparation of Cyanoethyl Corn Starch Derivatives

To 10 liters of corn starch slurry (40.87% dry substance starch by weight) were added 10% anhydrous sodium sulfate (% based on the dry substance starch) and 590 ml of caustic salt solution (a solution of sodium hydroxide and sodium chloride having 1.65 equivalents of titratable caustic per liter and a density of 27° Baumé' at 20° C.). The slurry alkalinity (ml of 0.1N HCl required to neutralize 30 ml of slurry) was 24.0. To each of six 2-quart jars was added 1597 ml of the slurry (equivalent to 728 g of dry substance starch per jar). The jars, equipped with stirrers and ports for addition of reagents, were placed in a water bath (in a hood) set for 45° C. The appropriate quantity of acrylonitrile was added to each jar as presented in the table below. After 16 hours of reaction time the mixtures were adjusted to pH 6.3, filtered and washed twice and dried at 180° F. Each sample was analyzed for Kjeldahl nitrogen and from the nitrogen value (less 0.04%) the degree of substitutions of cyanoethyl groups was calculated.

|  | A-1 | A-2 | A-3 | A-4 | A-5 | A-6 |
|---|---|---|---|---|---|---|
| Acrylonitrile Used (% based on dry substance starch) | 1.0 | 2.5 | 3.0 | 3.5 | 4.0 | 6.0 |
| Nitrogen Analysis (%N) | 0.259 | 0.585 | 0.674 | 0.709 | 0.844 | 1.324 |
| Calculated Degree of Substitution | 0.030 | 0.069 | 0.080 | 0.084 | 0.101 | 0.161 |

The cyanoethyl corn starch derivatives were enzyme thinned and graft polymerized and the viscosity stability of the resulting products was determined.

B. Preparation of Acetyl Corn Starch Derivatives

The method of C. E. Smith and J. V. Tuschhoff, U.S. Pat. No. 3,081,296, utilizing vinyl acetate in aqueous media was used to prepare acetate derivatives of corn starch of differing degrees of substitution.

Dried, powered corn starch (approximately 4369 g dry basis) was added with stirring to water to give 9000 ml of a 23.0° Baumé' starch slurry (40.8% dry substance). The pH of the mixture was adjusted to 7.0 and 1500 ml of slurry were placed in each of six 2-quart jars (equivalent to 728 g dry substance starch each). The 2-quart jars, equipped with stirrers and ports for addition of reagents, were placed in a constant temperature water bath. With the bath temperature at 27° C., the appropriate quantity of sodium carbonate was added followed by the appropriate quantity of vinyl acetate (see below). After a reaction time of 45 minutes, each slurry was adjusted to pH 6.4 using dilute hydrochloric acid. Each product slurry was filtered through paper, washed twice with additional water and then dried in a forced air oven at approximately 180° F. Analyses for acetyl content by standard methods, were obtained to determine the degree of acetyl substitution for each product.

|  | B-1 | B-2 | B-3 | B-4 | B-5 | B-6 |
|---|---|---|---|---|---|---|
| Quantity of Sodium Carbonate Used (% based on dry substance starch) | 0.63 | 1.44 | 1.92 | 2.64 | 3.33 | 4.29 |
| Quantity of Vinyl Acetate Added (% based on dry substance starch) | 2.10 | 4.80 | 6.40 | 8.80 | 11.11 | 14.3 |
| Acetyl Content (%) | 0.83 | 1.77 | 2.66 | 3.26 | 3.88 | 4.85 |
| Calculated Degree of Substitution | 0.032 | 0.068 | 0.103 | 0.127 | 0.152 | 0.192 |

The starch acetate derivatives were then enzyme thinned and graft polymerized and the viscosity stability of the resulting products was determined.

C. Preparation of Diethylaminoethyl Corn Starch Derivatives

To each of four, 2-quart jars contained in a water bath and equipped with stirrers was added 1500 ml of suspension containing 728 g of powdered corn starch. To each suspension was added 158 g sodium sulfate, the appropriate quantity of diethylaminoethyl chloride reagent (see below) and the pH was adjusted to approximately 7.0. To each suspension was then added the appropriate quantity (see below) of a caustic-salt solution (a solution containing 6.60 g of sodium hydroxide and 25.6 g of sodium chloride per 100 ml). The reaction mixtures were stirred for 7 hours at 50°–55° C., cooled and filtered on a Buchner funnel. Methanol was added in cases where filtration was inhibited by swelled starch particles. The DEAE starch derivatives were washed twice with water or water/methanol (35/65) solution and dried. Nitrogen contents (Kjeldahl Method) were obtained to calculate degree of derivatization.

|  | C-1 | C-2 | C-3 | C-4 |
|---|---|---|---|---|
| Diethylaminoethyl chloride used (% based on Starch) | 3.19 | 6.37 | 12.74 | 21.23 |
| Caustic-Salt Solution used (ml/1500 ml of starch suspension) | 164 | 328 | 655 | 1091 |
| Nitrogen Content (% dry basis) | 0.299 | 0.437 | 0.549 | 1.04 |
| Calculated Degree of | 0.035 | 0.052 | 0.066 | 0.130 |

|  | C-1 | C-2 | C-3 | C-4 |
|---|---|---|---|---|
| Substitution | | | | |

The DEAE-starch derivatives were enzyme thinned and graft polymerized and the viscosity stability of the resulting products was determined.

D. Preparation of Carbamylethyl Corn Starch Derivatives

Acrylamide was reacted with granular starch in alkaline slurry employing the method of E. F. Paschall, U.S. Pat. No. 2,928,827. To 7500 ml of corn starch slurry containing 3622 g dry substance starch was added 790 g of anhydrous sodium sulfate and 815 ml of caustic-salt solution (a solution containing 6.60 g of sodium hydroxide and 25.6 g of sodium chloride per 100 ml). The alkaline slurry was divided into four equal portions and placed in four 2-quart jars, contained in a water bath and equipped with stirrers and thermometers. The appropriate quantity (see below) of acrylamide was added to each jar and the mixtures were allowed to react at 52° C. for 18 hrs. The resulting starch slurries were adjusted to pH 4.0 then filtered using a Buchner funnel. The filtered products were then washed twice each with water, filtered and dried. The resulting starch derivatives were analyzed for nitrogen (Kjeldahl Analysis) and carboxyl content (carboxyl groups are created by partial hydrolysis of carbamylethyl groups to form carboxyethyl groups) to calculate the degree of derivatization.

|  | D-1 | D-2 | D-3 | D-4 |
|---|---|---|---|---|
| Acrylamide Used (% of dry substance starch) | 1.32 | 3.07 | 3.95 | 7.89 |
| Nitrogen Analysis (% dry basis) | 0.162 | 0.345 | 0.431 | 0.769 |
| Carboxyl Analysis (% dry basis) | 0.116 | 0.224 | 0.287 | 0.485 |
| Calculated Degree of Substitution, Carbamylethyl Groups | 0.019 | 0.041 | 0.051 | 0.093 |
| Calculated Degree of Substitution, Carboxyethyl Groups | 0.004 | 0.008 | 0.010 | 0.018 |
| Calculated Total Degree of Substitution | 0.023 | 0.049 | 0.061 | 0.111 |

These starch derivatives were enzyme thinned and graft polymerized and the viscosity stability of the resulting products was determined.

E. Enzyme Thinning and Graft Polymerization

The following procedure was used to prepare graft copolymers of each of the samples in A through D of this example.

Into a 2-liter resin kettle equipped with an agitator, a thermometer, a reflux condenser, and a nitrogen gas dispersion tube were placed 650 g deionized water then 350 g (dry basis) derivatized starch, to give a 35% starch slurry. The pH was adjusted to 7.5–7.8, followed by the addition of 4350 liquefons of alpha-amylase activity derived from B. subtilis. The slurry was heated to 78° C. over a forty-five minute period and held at 78° C. until the viscosity of the gelatinized starch was approximately 200 cps (24° C. Brookfield, No. 2 Spindle, 20 rpm). The enzyme was inactivated by heating to 96° C. and the liquefied starch cooled to approximately 60° C. At a temperature not greater than 60° C., a nitrogen sparge was started and 12.5 g Triton X-200 surfactant was added, followed by the addition of 178.5 g ethyl acrylate. At a temperature of 48°–52° C., 6.13 g ceric ammonium nitrate dissolved in 15 g of deionized water was added. After the exothermic reaction subsided (approximately 20° C. temperature increase) the reaction temperature was maintained at 75° C. for three hours. Then 0.5 g each of ammonium persulfate and sodium metabisulfite was added to the reaction mixture to reduce the level of unreacted monomer. The mixture was maintained at 75° C. for an additional one hour period, cooled to room temperature and the pH adjusted to 8.5 with 28 percent ammonium hydroxide. The final preparations had a solids content of approximately 45.0%.

The following table summarizes the data obtained on viscosity stability of the samples.

TABLE 3

| Substituent: | Days to 100% Increase in Viscosity | | | |
|---|---|---|---|---|
|  | DEAE* | Acetyl | Cyanoethyl | Carbamylethyl |
| D of S | | | | |
| 0.023 | | | | 1–2 |
| 0.030 | | | <1 | |
| 0.032 | | 2–3 | | |
| 0.035 | <1 | | | |
| 0.049 | | | | 1–2 |
| 0.052 | 1–2 | | | |
| 0.061 | | | | 5–6 |
| 0.066 | >>60 | | | |
| 0.068 | | 15–16 | | |
| 0.069 | | | 7–8 | |
| 0.081 | | | 16–17 | |
| 0.101 | | | >60 | |
| 0.103 | | >60 | | |
| 0.111 | | | | 57–58 |
| 0.130 | ** | | | |
| 0.152 | | ** | | |
| 0.161 | | | ** | |
| 0.192 | ** | | | |

*Diethylaminoethyl
**No significant change in viscosity at 60 days. These data are depicted in the graph, FIG. 1.

EXAMPLE VI

This Example shows the relation of the intrinsic viscosity of the thinned starches to tensile strength and abrasion resistance of graft copolymers made from the thinned starch.

Four samples of a cyanoethyl-substituted corn starch prepared as in Example V, A-6 (D. of S. 0.161) were enzyme thinned, according to the procedure of Example, V, E, to differing viscosities. Each of these four samples was graft polymerized following the procedure of V,E.

Free films of the graft copolymers were cast on Mylar (T.M.). The films were dried, cut in strips ½" wide and then stored at approximately 65% relative humidity (R.H.) and 70° F. for about 5 days. The average thickness of the films was determined and the tensile strength of the films was measured using an Instron-TM Universal Testing Instrument. The tensile strength related to each of the intrinsic viscosities of the derivatized and thinned starch appears in Table 2, below.

The four graft copolymers were affixed as sizes to a 50% cotton/50% polyester yarn and conditioned at 65% R. H. and 70° F. for about 2 days. The abrasion resistance of these samples was then determined with a Walker Abrader according to the method of Stallings and Worth, "Textile Industries", March, 1950. This method consists of abrading 36 sets of yarns and recording the number of cycles to obtain the first 11 breaks. The results appear in Table 4.

TABLE 4

| Intrinsic Viscosity dl/g | Tensile Strength g/mm² | Abrasion Resistance (cycles to 11th break) |
|---|---|---|
| 0.1 | 1470 | 825 |
| 0.14 | 2030 | 1150 |
| 0.185 | 1950 | 1120 |
| 0.273 | 1870 | 1020 |

Examples VII and VIII illustrate paper coatings prepared from the starch graft copolymers of this invention. The following basic formula was utilized to prepare the paper coatings described in Examples VII and VIII:

| Paper Coating Formula | Parts by Weight |
|---|---|
| Edgar HT Clay | 100 |
| Tetrasodium Pyrophosphate | 0.3 |
| Adhesive | 18 |
| Melamine Formaldehyde Insolubilizer (Parex 613) | 1.44 |
| Calcium Stearate (Nopco C-104) | 0.5 |
| Water to make 60% total solids. | |

EXAMPLE VII

This example illustrates the use of a starch graft copolymer in conjunction with a commercial, enzyme-converted corn starch as an adhesive in the paper coating formula. Table 5, following, compares this formulation with those made with starch alone and with a combination of starch and a commercial adhesive.

The coatings were applied to 51# basis weight unsized paper using a laboratory Keegan trailing blade coater.

TABLE 5

| Adhesive: | Clinton 406-B Corn Starch | Polymer of Example II & Clinton 406-B Corn Starch | Styrene-Butadiene Copolymer (Dow 636) & Clinton 406-B Corn Starch | Polyvinylacetate (Borden 2140) & Clinton 406-B Corn Starch |
|---|---|---|---|---|
| Adhesive, Parts: | | | | |
| Corn Starch Clinton 406-B | 18 | 9 | 9 | 9 |
| Polymer | 0 | 9 | 9 | 9 |
| Coating Properties: | | | | |
| Viscosity (Brookfield, cps, 100° F., 100 rpm | 468 | 690 | 467 | 268 |
| Coat Weight, lb/ream | 5.9 | 6.7 | 7.3 | 7.7 |
| IGT Strength, #3 Ink, ft/min | 153 | 246 | 331 | 241 |
| Brightness | 80 | 81 | 80 | 81 |
| Opacity | 91 | 91 | 90 | 90 |
| Gloss, Calendered at 1500 PLI | 50 | 66 | 67 | 72 |

EXAMPLE VIII

This Example illustrates the use of a starch graft copolymer dispersion as the sole adhesive in a pigmented coating made according to the basic formula above. Table 6, following, compares this formulation with two made with commercial adhesives. In this Example, also, the coatings were applied to 51# basis weight unsized paper with a laboratory Keegan trailing blade coater.

TABLE 6

| Adhesive: | Polymer of Example II | Styrene-Butadiene Copolymer (Dow 636) | Polyvinylacetate (Borden 2140) |
|---|---|---|---|
| Adhesive, Parts | 18 | 18 | 18 |
| Coating Solids, % | 63 | 63 | 63 |
| Coating Properties: | | | |
| Viscosity (Brookfield, cps, 100° F., 100 rpm) | 350 | 60 | 100 |
| Coat Weight lb/ream | 7.0 | 7.5 | 8.5 |
| IGT Strength #3 Ink, ft/min | 210 | 550 | 185 |
| Brightness | 81 | 80 | 80 |
| Opacity | 90 | 90 | 90 |
| Gloss, Calendered at 1500 PLI | 63 | 62 | 62 |

The terms and expressions used herein are descriptive and are not to be interpreted as limiting the invention or excluding any equivalent materials or procedures since it is recognized that modifications or substitutions of the features described may be made within the scope of the claimed invention.

What is claimed is:

1. A stable aqueous polymeric dispersion comprised of at least 25% solids by weight of a graft copolymer of at least one vinyl monomer and a derivatized and thinned starch with a degree of substitution of at least about 0.05 and an intrinsic viscosity of not less than 0.12 dl/g wherein the starch/monomer ratio of the graft copolymer is less than 100/25 by weight.

2. The dispersions of claim 1 wherein the derivatized and thinned starch has a degree of substitution in the range from about 0.05 to about 0.4 and an intrinsic viscosity in the range from about 0.12 to about 0.28.

3. The dispersions of claim 1 wherein the starch has a degree of substitution in the range about 0.06 to about 0.2 and an intrinsic viscosity in the range from about 0.13 to about 0.21.

4. The dispersions of claim 1, 2 or 3 wherein the polymeric dispersion is comprised of at least 40% solids by weight of the starch graft copolymer.

5. The dispersions of claim 1, 2 or 3 wherein the starch/monomer ratio is from about 100/40 to about 100/200 by weight.

6. The dispersions of claim 4 wherein the starch/monomer ratio is from about 100/40 to about 100/200 by weight.

7. A stable aqueous polymeric dispersion comprised of at least 40% solids by weight of a starch graft copolymer of at least one vinyl monomer and a derivatized and thinned starch with a degree of substitution in the range from about 0.06 to about 0.2 and an intrinsic viscosity in the range from about 0.13 dl/g to about 0.21 dl/g wherein the starch/monomer ratio is from about 100/40 to about 100/100 by weight.

8. The dispersions of claim 7 wherein the starch graft copolymer is derived from a single vinyl monomer, said vinyl monomer being selected from the group consisting of acrylonitrile, vinyl acetate, methyl acrylate, ethyl acrylate, and methyl methacrylate.

9. The dispersions of claim 7 wherein the starch graft copolymer is derived from at least two vinyl monomers, said monomers being selected from the group consisting of methacrylic acid, ethyl acrylate, butyl acrylate, methyl methacrylate and diethylaminoethyl methacrylate.

10. The dispersions of claim 7 or 8 wherein the substituent on the derivatized starch is a non-ionic substituent.

11. The dispersions of claim 7 or 8 wherein the substituent on the derivatized starch is a cationic substituent.

12. The dispersions of claim 7 or 8 wherein the substituent on the derivatized starch is selected from the group consisting of hydroxyethyl, acetyl, cyanoethyl, carbamylethyl and diethylaminoethyl substituents.

13. The process of producing a stable aqueous polymeric dispersion comprised of at least 25% solids by weight of a starch graft copolymer of at least one vinyl monomer and a derivatized and thinned starch which comprises forming a derivatized and thinned starch with a degree of substitution of at least about 0.05 and an intrinsic viscosity of not less than about 0.12 dl/g and forming a graft copolymer of said derivatized and thinned starch and at least one vinyl monomer by means of an initiator which acts to initiate graft copolymerization onto the starch to the substantial exclusion of the initiation of homopolymerization or copolymerization of said vinyl monomer(s) and wherein the starch/monomer ratio of the thinned and derivatized starch to the vinyl monomer(s) is less than about 100/25 by weight.

14. The process of claim 13 wherein the derivatized and thinned starch has a degree of substitution in the range from about 0.05 to about 0.4 and an intrinsic viscosity in the range from about 0.12 to about 0.28.

15. The process of claim 14 wherein the initiator is a Ce(IV) compound.

16. The process of claim 13, 14 or 15 wherein the starch after derivatization is in granular form.

17. The process of claim 16 wherein the dispersion is comprised of at least 40% by weight of the said starch graft copolymer and wherein the starch/monomer ratio of the thinned and derivatized starch to the vinyl monomer(s) is in the range from about 100/40 to about 100/200 by weight.

18. The process for producing a stable aqueous polymeric dispersion comprised of at least 40% solids by weight of a starch graft copolymer of at least one vinyl monomer and a derivatized and thinned starch which comprises polymerizing at least one vinyl monomer with a derivatized and thinned starch having a degree of substitution in the range from about 0.06 to about 0.2 and an intrinsic viscosity in the range from about 0.13 to about 0.21 by means of a ceric ammonium nitrate initiator and wherein the starch/monomer ratio of the thinned and derivatized starch is in the range from about 100/40 to about 100/100.

19. The process of claim 18 wherein the thinned and derivatized starch has been produced by a process whereby the starch remains in granular form after the derivatization step.

20. The process of claim 18 wherein the thinned and derivatized starch has been produced by the sequential steps of forming a granular derivatized starch followed by gelatinizing and thinning said starch.

21. The process of claim 19 wherein the starch has been thinned by enzymatic means.

22. The process of claim 19 wherein the starch graft copolymer is derived from a single vinyl monomer, said vinyl monomer being selected from the group consisting of acrylonitrile, vinyl acetate, methyl acrylate, ethyl acrylate and methyl methacrylate.

23. The process of claim 19 wherein the starch graft copolymer is derived from at least two vinyl monomers, said vinyl monomers being selected from the group consisting of methacrylic acid, ethyl acrylate, butyl acrylate, methyl methacrylate and dimethylaminoethyl methacrylate.

24. The process of claim 22 or 23 wherein the substituent on the derivatized starch is a non-ionic substituent.

25. The process of claim 22 or 23 wherein the substituent on the derivatized starch is a cationic substituent.

26. The process of claim 22 or 23 wherein the substituent on the derivatized starch is selected from the group consisting of hydroxyethyl, acetyl, cyanoethyl, carbamylethyl and diaminoethyl substituents.

27. A coating composition in which the adhesive binder is comprised of a stable, aqueous polymeric dispersion comprised of at least 25% solids by weight of a starch graft copolymer of at least vinyl monomer and a derivatized and thinned starch with a degree of substitution of at least about 0.05 and an intrinsic viscosity of not less than 0.12 dl/g wherein the starch/monomer ratio of said starch graft copolymer is less than about 100/25.

28. The method for the preparation of a coating composition in which a stable aqueous polymeric dispersion comprised of at least 25% solids by weight of a starch graft copolymer of at least one vinyl monomer and a derivatized and thinned starch with a degree of substitution of at least about 0.05 and an intrinsic viscosity of not less than 0.12 dl/g wherein the starch/monomer ratio of said graft copolymer is less than about 100/25 comprises the adhesive element in said composition.

29. The method of reducing breakage in a textile yarn which comprises applying starch graft copolymer solids derived from a stable, aqueous polymeric dispersion comprised of at least 25% by weight of a starch graft copolymer of at least one vinyl monomer and a derivatized and thinned starch with a degree of substitution of at least about 0.05 and an intrinsic viscosity of not less than about 0.12 dl/g wherein the starch/monomer ratio of said starch graft copolymer is less than about 100/25 to said textile yarn.

30. A sizing composition comprised of a stable, aqueous polymeric dispersion comprised of at least 25% by weight of a starch graft copolymer of at least one vinyl monomer and a derivatized and thinned starch with a degree of substitution of at last about 0.05 and an intrinsic viscosity of not less than about 0.12 dl/g wherein the starch/monomer ratio of said starch graft copolymer is less than about 100/25.

* * * * *